United States Patent
Huang et al.

(10) Patent No.: US 6,226,669 B1
(45) Date of Patent: May 1, 2001

(54) MUTLI-USER 3D VIRTUAL REALITY INTERACTION SYSTEM UTILIZING PROTOCOL DATA UNITS FOR DATA COMMUNICATION AMONG WWW SERVER AND CLIENTS

(75) Inventors: Jiung-Yao Huang, 4F, No. 24, Lane 29, Teng Kung Road, Tanshui, Taipei County (TW); Jia-Lin Chang; Ai-Jye Lee, both of Taipei (TW)

(73) Assignee: Jiung-Yao Huang, Tanshui (TW)

( * ) Notice: Subject to any disclaimer, the term of this patent is extended or adjusted under 35 U.S.C. 154(b) by 0 days.

(21) Appl. No.: 09/212,420

(22) Filed: Dec. 16, 1998

(30) Foreign Application Priority Data

Dec. 19, 1997 (TW) .................................. 86119263

(51) Int. Cl.[7] .................................................. G06F 15/16
(52) U.S. Cl. ......................... 709/204; 709/230; 709/227
(58) Field of Search .................................. 709/230, 204, 709/205, 227; 380/24; 370/397, 352; 345/474

(56) References Cited

U.S. PATENT DOCUMENTS

| | | | |
|---|---|---|---|
| 5,544,161 | * 8/1996 | Bigham et al. | 370/397 |
| 5,793,382 | * 8/1998 | Yerazunis et al. | 345/474 |
| 5,867,494 | * 2/1999 | Krishnaswamy et al. | 370/352 |
| 6,072,870 | * 6/2000 | Nguyen et al. | 380/24 |

OTHER PUBLICATIONS

Huang et al, "SharedWeb—A Shared Virtual Environment Over World Wide Web", Aug. 1997, pp. 178–189, IEEE.*

* cited by examiner

*Primary Examiner*—Le Hien Luu
(74) *Attorney, Agent, or Firm*—Bacon & Thomas, PLLC (57) ABSTRACT

Real-time interactivity is provided across a shared multiple-participant three-dimensional (3D) virtual-reality environment on the World Wide Web (WWW), with the purpose of allowing a plurality of users to participate in a 3D virtual-reality world where the participants can share information and interact with each other substantially in real time. Through the use of a Client-Information Manager Program (CIMP) module, which is connected via a Common Gateway Interface (CGI) module to the WWW server, each user is able to interactively communicate with any of the other users participating together in the same 3D virtual-reality world. The shared multiple-participant 3D virtual-reality environment utilizes modified Protocol Data Unit (PDU) formats based on the Distributive tive Interactive Simulation (DIS) protocol for data communication among the WWW server and the various client sites. Moreover, the shared multiple-participant 3D virtual-reality environment utilizes a Dead Reckoning (DR) method with a predetermined optimal mal DR threshold to help reduce the rate of Object-State PDUs that are generated in response sponse to changes in each user's avatar state, so that avatar state updates can be more quickly transmitted to all the other client sites participating in the same 3D virtual-reality world.

20 Claims, 8 Drawing Sheets

MUTLI-USER 3D VIRTUAL REALITY INTERACTION SYSTEM UTILIZING PROTOCOL DATA UNITS FOR DATA COMMUNICATION AMONG WWW SERVER AND CLIENTS

BACKGROUND OF THE INVENTION

1. Field of the Invention

This invention relates to World Wide Web (WWW) technology, and more particularly, to a method and system for implementing real-time interactivity across a shared multiple-participant three-dimensional (3D) virtual-reality environment on the WWW, with the purpose of allowing a plurality of users (participants) to participate in a 3D virtual-reality world where the participants can share information and interact with each other substantially in real time.

2. Description of Related Art

Virtual reality is a computer-generated simulation of a 3D scene that a user can experience and manipulate as if it were physically real. A 3D virtual-reality environment can be, for example, a chat room, a campus, a playground, a conference room, and so on, where users can experience the virtual-reality effect through a browser program. On the Internet, a multiple-participant 3D virtual-reality environment allows a number of users at different locations to browse information and interact with the other users participating in the same 3D virtual-reality world. Inside such an environment, each participant is represented by a 3D icon, commonly referred to as an avatar, that depicts the participant's virtual-reality identity in the environment. Participating in the same virtual-reality environment, all the participants from the distributed locations can see the same scene and hear the same sound provided by the 3D virtual-reality world.

In the design of a multiple-participant 3D virtual-reality environment, it is desired to maintain spatial consistency and time coherency among the various participants. Due to the intrinsic latency in network communications, however, time coherency is nearly unattainable. Spatial consistency, on the other hand, can be attained through the use of appropriate communication protocols that can send updated data in real time to each of the participants.

On the Internet, the WWW is based on a client/server architecture under which each WWW server serves up information to each client on a request-and-response basis, i.e., the connection between the client and the server is established only when the client issues a request to the server, and after the requested information has been served, the connection is immediately broken. The request-and-response operation can help reduce network traffic. In the use of a multiple-participant system, however, the request-and-response operation leads to three drawbacks: lack of server-to-client call-back capability, lack of client information recording capability and excessive network loading.

The drawback of lack of server-to-client call-back capability arises due to the fact that the connection between client and server is established only when the client issues a request to the server and is immediately broken after the requested information has been served. Due to this drawback, it is impossible for one user to send a message to any of the other users participating in the same 3D virtual-reality world. Moreover, after the re- quested information has been served, the server will record no information about the client who has just requested information from the 3D virtual-reality world.

One solution to provide server-to-client call-back and client information recording capabilities is disclosed in "*MOLTIP-UID and R-HTTP Specification*" by Chin, Chee-Kai, which is available online at:

www.ontc.ncb.gov.sg/staff/cheekai/htm/moltip-techspe.html

Chin's method utilizes a unique user identification number, named as a MOLTIP-UID number, for each client site. The MOLTIP-UID number consists of the following pieces of data: machine type (M), operating system (O), login usemame (L), timestamp (T), process ID (I), and listening port (L). When the link between the client site and the WWW server is established, the client site will send a MOLTIP-UID number to the WWW server. For the WWW server, the Chin's method utilizes a modified HTTP protocol, called Retum-HTTP (R-HTTP), which is capable of registering related identification information about each client site connected to the WWW server and sending information back to the connected client site based on the registered identification information.

One drawback to the Chin's method, however, is that it requires a modification to the existing HTTP protocol, which would make the implementation inconvenient to carry out. There exists, therefore, a new method which requires no modification to the existing HTTP protocol on the WWW server.

SUMMARY OF THE INVENTION

It is therefore an objective of this invention to provide a method and system for implementing real-time interactivity across a shared multiple-participant 3D virtual-reality environment on the WWW, which includes a server-to-client call-back capability that allows each of the users participating in the same 3D virtual-reality world to send a message to any one of the other users participating in the same 3D virtual-reality world.

It is another objective of this invention to provide a method and system for implementing real-time interactivity across a shared multiple-participant 3D virtual-reality environment on the WWW, which includes a client-information recording capability that can record the client information of each of the users participating in the same 3D virtual-reality world.

It is still another objective of this invention to provide a method and system for implementing real-time interactivity across a shared multiple-participant 3D virtual-reality environment on the WWW, which can perform network communication without excessive network loading.

In accordance with the foregoing and other objectives of this invention, a novel method and system is provided for implementing real-time interactivity across a shared multiple-participant 3D virtual-reality environment on the WWW.

The method of the invention is provided for use on a network system, such as the Internet, which includes a plurality of client sites and a WWW server providing a shared multiple-participant 3D virtual-reality environment. The method comprising the steps of: (1) providing a CIMP module with a client table for registering client information about each client site participating in the shared multiple-participant 3D virtual-reality environment; (2) linking the CIMP module via a CGI module to the WWW server; (3) at a newcomer's client site that just logs into the shared multiple-participant 3D virtual-reality environment, issuing a login request via the network system to the WWW server, causing the WWW server to download a virtual-reality scene file back to the newcomer's client site; (4) at the newcomer's client site, issuing an Initial PDU via the network system to the WWW server when the downloaded virtual-reality scene file is received; (5) at the WWW server, forwarding the received Initial PDU via the CGI module to the CIMP module;(6) at the CIMP module, upon receiving the Initial PDU, performing the steps of: (6-1) issuing an Acknowledge PDU with a uniquely-assigned User ID via the network system back to the newcomer's client site; and (6-2) forwarding the received Initial PDU together with the newcomer's User ID to every other client site that is previously regis- tered in the client table indicative of current participation in the shared multiple- participant 3D virtual-reality environment; (7) at any client site, if a change in avatar state occurs, issuing a corresponding Object-State PDU indicative of the change in avatar state to the CIMP module; and (8) at the CIMP module, broadcasting the received Object-State PDU to every other client site currently participating in the shared multiple-participant 3D virtual-reality environment, if any.

The SharedWeb system of the invention includes: (a) a WWW server for serving up a plurality of virtual-reality scene files, each representing a 3D virtual-reality world; (b) a browser program running at each of the participating client sites; (c) a CGI module connected to the WWW server; and (d) a CIMP module having a client table, the CIMP module being coupled to the CGI module so that PDU information received by the WWW server can be forwarded from the WWW server to the CIMP module and being used for managing client information about every client site currently participating in the virtual-reality world, if any.

Through the use of a Client-Information Manager Program (CIMP) module, the SharedWeb system is capable of performing a client information recording function and a server-to-client call-back function that allow the users to interact with each other. Moreover, through the use of a Dead Reckoning method, Object-State PDUs can be transmitted in minimum amounts, thus increasing the degree of real-time interactivity among the users.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
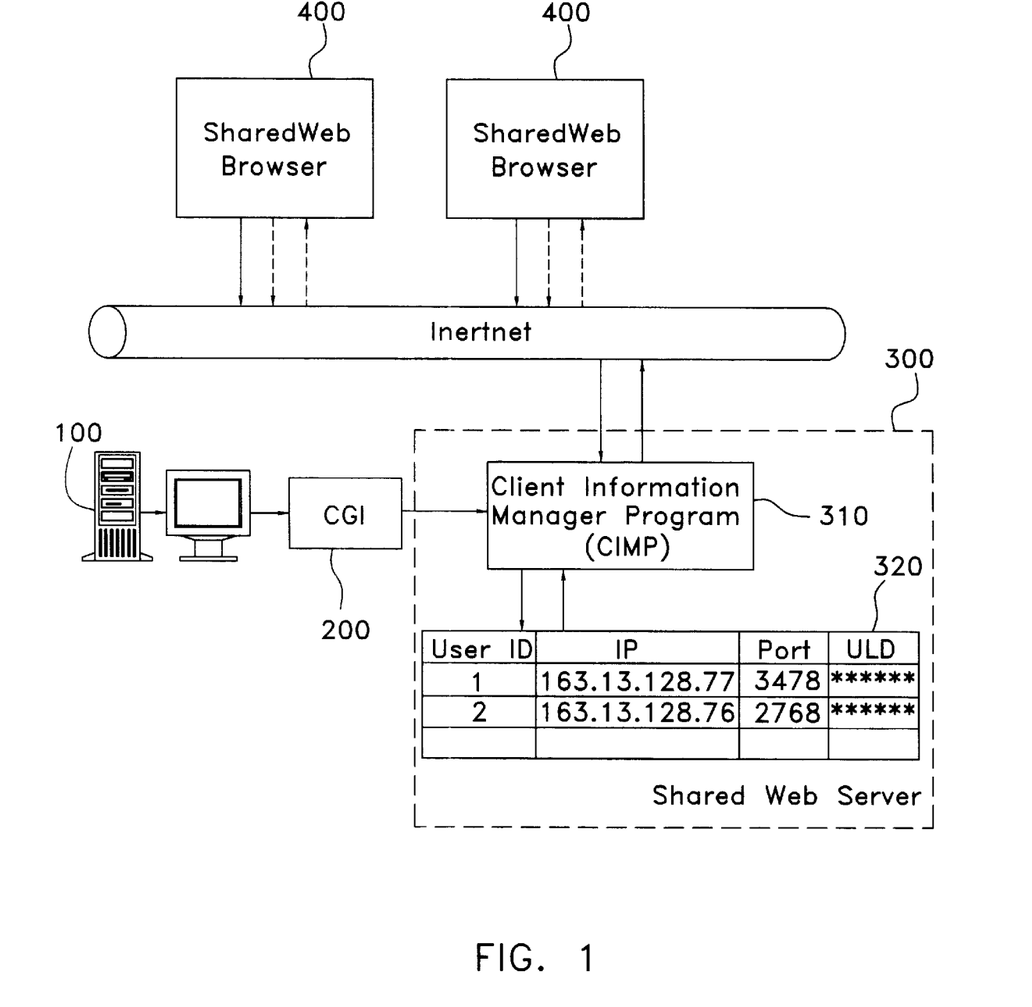
FIG. 1 is a schematic diagram showing the basic configuration of the shared multiple-participant 3D virtual-reality environment (SharedWeb system) of the invention on the WWW.

FIG. 1 is a schematic diagram showing the basic configuration of the shared multiple-participant 3D virtual-reality environment of the invention on the WWW. The shared multiple-participant 3D virtual-reality environment of the invention is herein and hereinafter named and referred to as a Shared Web system.

As shown, the SharedWeb system of the invention is designed for use with a network system 10, such as a LAN (Local Area Network) system, a WAN (Wide Area Network) system, or the Internet. On the server side, the SharedWeb system includes a WWW server (also called HTTP server) 100, a CGI (Common Gateway Interface) module 200 linked to the WWW server 100, and an auxiliary server 300 linked via the CGI module 200 to the WWW server 100, which is named as a SharedWeb server and includes a CIMP linked to the CGI module 200 module 310 and a client table 320. On the client side, the SharedWeb system includes a plurality of client sites 400, each running a browser program named as a SharedWeb browser (for simplification of the drawing, only two client sites are shown).

The WWW server 100 is used to serve up a number of virtual-reality scene files in HTML (Hypertext Markup Language) format, each representing a 3D virtual-reality world provided by the SharedWeb system. The CGI module 200 is coupled between the WWW server 100 and the SharedWeb server 300, and is used to transfer PDU information (described later in this section) received by the WWW server 100 from any of the client sites 400 to the SharedWeb server 300.

Each of the client sites 400 is installed with a SharedWeb browser, which is designed in accordance with the invention to allow the user to participate in the 3D virtual-reality world at the WWW server 100 and interact with the other users at the other client sites participating in the same 3D virtual-reality world.

In the SharedWeb server 300, the CIMP module 310 is used to manage data stored in the client table 320 used to store the information about each client site, if any, that is currently participating in the associated 3D virtual-reality world. Each piece of client information is formatted as follows:

| User ID | IP Address | Listening Port | LTP-UID | Location (x, y, z) | Orientation (x, y, z) |
|---|---|---|---|---|---| where

| | |
|---|---|
| User ID | shows a unique User ID number assigned by the CIMP module 310 to the associated client site; |
| IP Address | shows the IP (Internet Protocol) address of the associated client site; |
| Listening Port | shows the listening port of the associated client site; |
| LTP-UID | shows three pieces of user information: user's login name (L), time stamp (T), and listening port (P); |
| Location (x, y, z) | shows the current location of the avatar of the associated client site in the 3D virtual-reality world; and |
| Orientation (x, y, z) | shows the current orientation of the avatar of the associated client site in the 3D virtual-reality world. |

It is a characteristic part of the invention in comparison with Chin's method that, rather than the MOLTIP-UID number used by the Chin's method, the LTP-UID number used by the invention includes only three pieces of information: user's login name (L), time stamp (T), and listening port (P). The use of the CIMP module 310 and the associated client table 320 can provide a client information recording capability to record the information about each client site that is currently participating in the same 3D virtual-reality world provided by the WWW server 100. Further, this client information recording capability can help the SharedWeb system of FIG. 1 to provide a server-to-client call-back capability, allowing everyone of the users participating in the same 3D virtual-reality world to chat with each other. This interactive communication between the participants is carried out through the use of modified PDU formats based on the Distributive Interactive Simulation (DIS) protocol.

Modified PDU Formats

The SharedWeb system of FIG. 1 utilizes six kinds of Protocol Data Units (PDU) for data communication between the SharedWeb server 300 and the SharedWeb browser at each of the client sites 400, which includes an Initial PDU, an Acknowledge PDU, an Object-State PDU, an End PDU, a Chat PDU, and an Error PDU. These PDUs are similar to those defined in the DIS protocol, but are otherwise modified in accordance with the invention for use in the SharedWeb system. The data format of each of these PDUs are depicted in the following.

Each of the PDUs includes a PDU Header field which contains header information that identifies the purpose of the associated PDU. Each PDU Header field contains the following five pieces of header information:

PDU Header={Protocol Version, PDU Type, Time Stamp, Scene name, Scene ID} where

Protocol Version shows the version number of the associated PDU;

| | |
|---|---|
| PDU type | shows the type of the associated PDU, whether an Initial PDU, an Acknowledge PDU, an Object-State PDU, an End PDU, a Chat PDU, or an Error PDU; |
| Time Stamp | shows the time when the associated PDU was issued; |
| Scene Name | shows the filename of the virtual-reality scene file being currently downloaded to the associated client site; and |
| Scene ID | shows a unique identification name for the virtual-reality scene being currently downloaded to the associated client site, which is assigned by the SharedWeb server 300. |

Moreover, most PDUs include a User Information field which contains user information about the identity of the associated client site. Each User Information field contains the following three pieces of user information:

User Information={User ID, IP Address, Avatar Type } where

| | |
|---|---|
| User ID | shows a unique User ID number assigned by the SharedWeb server 300 to the associated client site when the login to the SharedWeb system is successful; |
| IP Address | shows the IP address of the associated client site; and |
| Avatar Type | shows the type of avatar selected by the user at the associated client site to represent him/her in the 3D virtual-reality world. |

The foregoing PDU Header field and User Information field are common to all or some of the PDUs. Detailed data format of each PDU is depicted in the following.

(1) Initial PDU

An Initial PDU is issued from a newcomer's client site when the requested virtual-reality scene file is successfully downloaded from the WWW server 100 to the newcomer's client site. The Initial PDU format includes the following three fields of information:

Initial PDU={PDU Header, User Information, LTP-UID} where

| | |
|---|---|
| PDU Header | shows the header information of the Initial PDU, as depicted earlier in this section; |
| User Information | shows the user information of the Initial PDU, as depicted earlier in this section; and |
| LTP-UID | shows the LTP-UID number of the Initial PDU. |

(2) Acknowledge PDU

In response to each received Initial PDU, the SharedWeb server 300 will issue an Acknowledge PDU back to the newcomer's client site. The Acknowledge PDU format includes the following three fields of information:

Acknowledge PDU={PDU Header, User Information, LTP-UID} except that the PDU Header field contains no PDU Type and Time Stamp. In addition, the SharedWeb server 300 will send a uniquely-assigned User ID number together with the Acknowledge PDU back to the newcomer's client site. An Acknowledge PDU will also be issued when an End PDU is received from a client site.

(3) Object-State PDU

An Object-State PDU is generated in response to a change in the avatar state of each participating client site. The Object-State PDU format includes the following pieces of information:

Object-State PDU={PDU Header, User Information, Location, Linear Velocity, Orientation, DR parameter} where

| | |
|---|---|
| PDU Header | shows the header information of the Object-State PDU, as depicted earlier in this section; |
| User Information | shows the user information of the Object-State PDU, as depicted earlier in this section; |
| Location | shows the current location of the avatar of the associated user; |
| Linear Velocity | shows the linear velocity of the avatar movement causing the generation of the Object-State PDU; |
| Orientation | shows the current orientation of the avatar of the associated user; and |
| DR parameter | indicates a user-specified Dead Reckoning algorithm used to estimate a DR value. |

(4) End PDU

An End PDU is issued to the SharedWeb server 300 from the SharedWeb browser at the client site that wants to exit the 3D virtual-reality world. The End PDU format is substantially the same as the Initial PDU format and the Acknowledge PDU format except that its PDU Header field contains no PDU Type and Time Stamp.

(5) Chat PDU

A Chat PDU is used to transfer real-time chat from one participating client site to the other. The Chat PDU format is designed to comply with the Internet Relay Protocol.

(6) Error PDU

An Error PDU is generated when an error occurs in the SharedWeb system.

Operation of the SharedWeb System

Referring to FIG. 1, when a newcomer wants to participate in the 3D virtual-reality world provided by the WWW server 100, he/she should first perform a login process through the SharedWeb browser at his/her client site (i.e., one of the client sites 400). The SharedWeb browser at the newcomer's client site will then issue a login request via the network system 10 to the WWW server 100. In response, the WWW server 100 sends the scene file of the requested 3D virtual-reality world back to the newcomer's client site. After the virtual-reality scene file is received, the SharedWeb browser at the newcomer's client site promptly issues an Initial PDU to the WWW server 100.

Upon receiving the Initial PDU, the WWW server 100 first activates the CGI module 200 to forward the received Initial PDU to the SharedWeb server 300. In response, the SharedWeb server 300 issues an Acknowledge PDU with a uniquely assigned User ID number back to the newcomer's client site.

Next, the CIMP module 310 in the SharedWeb server 300 looks up the client table 320 to see if the newcomer-requested 3D virtual-reality world is currently being participated by other users. If YES, the SharedWeb server 300 forwards the received Initial PDU and the newcomer's User ID number to all of the client sites that are currently participating in the same 3D virtual-reality world requested by the newcomer.

Thereafter, with a number of users participating in the same 3D virtual-reality world, the avatar action taken by any of the users, i.e., any change in the avatar state of a user, will cause his/her SharedWeb browser to generate a corresponding Object-State PDU and issue this Object-State PDU via the WWW server 100 and CGI module 200 to the SharedWeb server 300. In response, the SharedWeb server 300 broadcasts this Object-State PDU to all of the other client sites participating in the same 3D virtual-reality world, thereby providing a substantially real-time interactivity across the SharedWeb system.

Interactivity Enhancement with Dead Reckoning Method

The interactivity among the users participating in the same 3D virtual-reality world is strongly dependent on the number of Object-State PDUs generated per second in response to changes in avatar state by a user. The data amount per second from the generated Object-State PDUs is equal to the size of one Object-State PDU multiplied by the Object-State PDU rate.

It is an important aspect of the invention that a Dead Reckoning method is used to minimize the Object-State PDU rate by reducing the number of Object-State PDUs generated per second in response to changes in any user's avatar state. In accordance with the Dead Reckoning method, the predicated avatar position P during the course of a positional change is determined by the following linear equation:

$$P = P_O + V^*t$$

where $P_O$ denotes the current avatar position;

V denotes the speed of the avatar movement; and t denotes the time required to move the avatar from $P_O$ to P, (hereinafter referred to as DR time), and is defined as a logical time based on the target frame rate of the 3D virtual-reality world provided by the WWW server 100 rather than the system clock time at each client site.

The reason of defining the DR time t as a logical time rather than the system clock time at each client site is that this can ensure that the avatar movement would be independent on the computing power at each different client site.

Customarily, the target frame rate for displaying the 3D virtual-reality world is 30 frames per second; and therefore, the unit for the DR time is defined as 1/30 of the system clock rate at the WWW server 100.

In accordance with the Dead Reckoning method, if the difference between the actual avatar position and the predicted avatar position is greater than a threshold (hereinafter referred to as DR threshold), an Object-State PDU is generated to reflect such a change in the avatar position. Fundamentally, a greater DR threshold would cause a larger degree of visually-perceptible jerky motion in the avatar movement; and whereas, a smaller DR threshold would cause an increase in the Object-State PDU rate, which would cause a delayed display of the avatar change to all the other users participating in the same 3D virtual-reality world In the determination of the optimal DR threshold, it is assumed that each pace in the avatar movement is equal to the width of the avatar, and the DR threshold is measured in terms of the number of paces in the difference between the predicted avatar position (DR value) and the actual avatar position. For example, if the DR threshold is set at 3, it will cause an Object-State PDU to be generated each time the difference between the predicted avatar position and the actual avatar position exceeds three times the width of the avatar.

Figure 2:
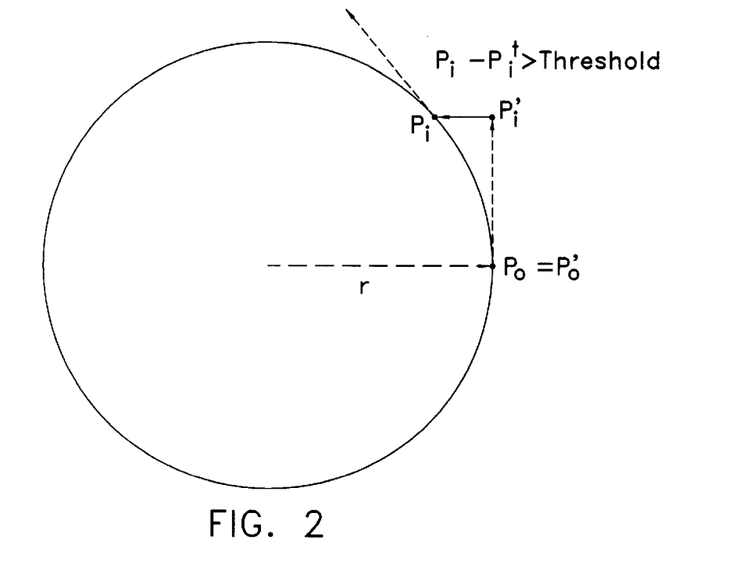
FIG. 2 is a schematic diagram used to depict the principle of a Dead Reckoning method utilized by the invention.

Asssume in the worst case (i.e., in which the maximum possible Object-State PDU occur), it can be theoretically derived that a circular movement of the avatar would incur the worst case, which is depicted in reference to FIG. 2.

Referring to FIG. 2, assume the point $P_O$ represents the original avatar position; $P_i'$ represents the predicted avatar position by the Dead Reckoning method; and $P_i$ represents the actual avatar position after a positional change by the user. An Object-State PDU will be generated each time the difference between the actual avatar position and the predicted avatar position exceeds the preset DR threshold. By setting the radius r of the circular movement to a suitable value, say 10 times each pace of the avatar movement, the number of generated Object-State PDUs per logical time unit can be set to equal to the DR threshold. Further, it is assumed that the avatar moves at a constant velocity.

Under the foregoing assumptions, the number of generated PDUs with various frame rates and DR threshold values are shown in the following table.

TABLE

Number of generated PDUs with various frame rates and DR thresholds

| DR Threshold | Frame Rate | | | | |
|---|---|---|---|---|---|
| | 8 | 12 | 24 | 36 | 52 |
| 10 | 4.02562 | 6.21677 | 12.4024 | 18.2287 | 26.1428 |
| 20 | 2.68712 | 4.16112 | 8.49192 | 11.8745 | 17.6048 |
| 30 | 2.02458 | 3.15029 | 6.32563 | 9.12651 | 12.9868 |
| 40 | 1.62442 | 2.50606 | 5.02114 | 7.29393 | 10.3976 |
| 50 | 1.34774 | 2.09612 | 4.17452 | 5.98301 | 8.62408 |

Figure 3:
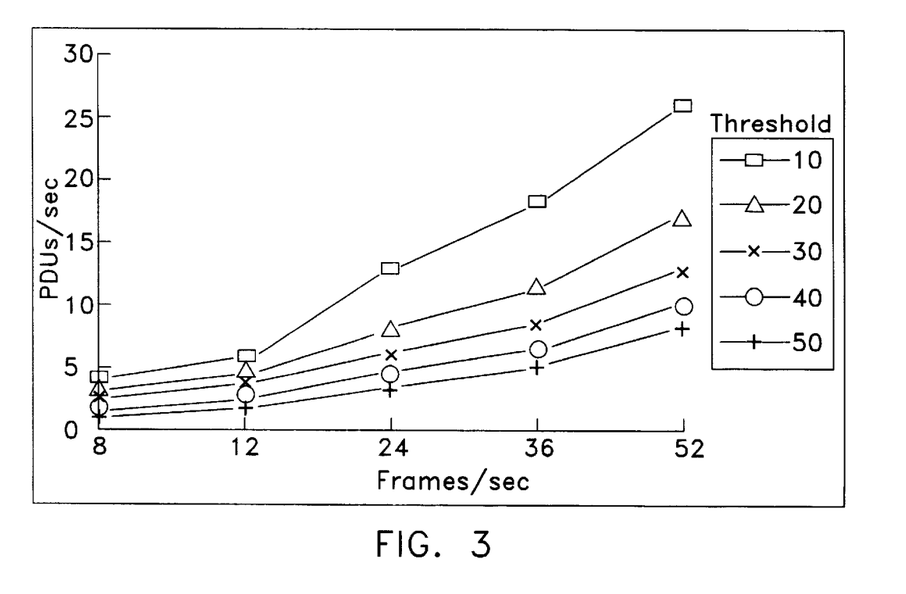
FIG. 3 is a graph, showing the plots of Object-State PDU rate versus frame rate under various DR threshold values.

The data shown in the foregoing table is further represented in a graph shown in FIG. 3. It can be learned from the foregoing table and the graph of FIG. 3 that in the case of the DR threshold being set at 10, the Object-State PDU rate is nearly approximate to ½ frame rate; in the case of the DR threshold being set at 20, the Object-State PDU rate is nearly approximate to ⅓ of the frame rate; in the case of the DR threshold being set at 30, the Object-State PDU rate is nearly approximate to ¼ of the frame rate; in the case of the DR threshold being set at 40, the Object-State PDU rate is nearly approximate to ⅕ of the frame rate; and in the case of the DR threshold being set at 50, the Object-State PDU rate is nearly approximate to ⅙ of the frame rate.

As a compromise between Object-State PDU rate and smooth visual-effect in the avatar movement, the DR threshold of 30 is chosen for use in the SharedWeb system. In the worst case, this DR threshold of 30 would cause one Object-State PDU to be generated approximately every 4 frames. Since the Object-State PDU format is 528 bits in length, the data rate of thus-generated Object-State PDUs is 3,168 bits per second at a 24 Hz display rate. Therefore, provided that the network system 10 has a bandwidth of 1 megabits, the SharedWeb system can support at least 300 users to participate in the same 3D virtual-reality world at the same time.

Moreover, in order to reduce end-to-end latency, the Unreliable Datagram Protocol (UDP) is used at the SharedWeb server 300 for transfer Acknowledge PDUs and Object-State PDUs to each of the client sites 400. The UDP would cause data loss, but which is negligible in terms of visually reproducing the 3D virtual-reality world to the user.

Detailed System Architecture of the SharedWeb System

Detailed system architecture of the SharedWeb system is shown in FIGS. 4–9. The architectures shown in these drawings are only used for exemplary purpose, and not intended to limit the scope of the invention.

Figure 4:
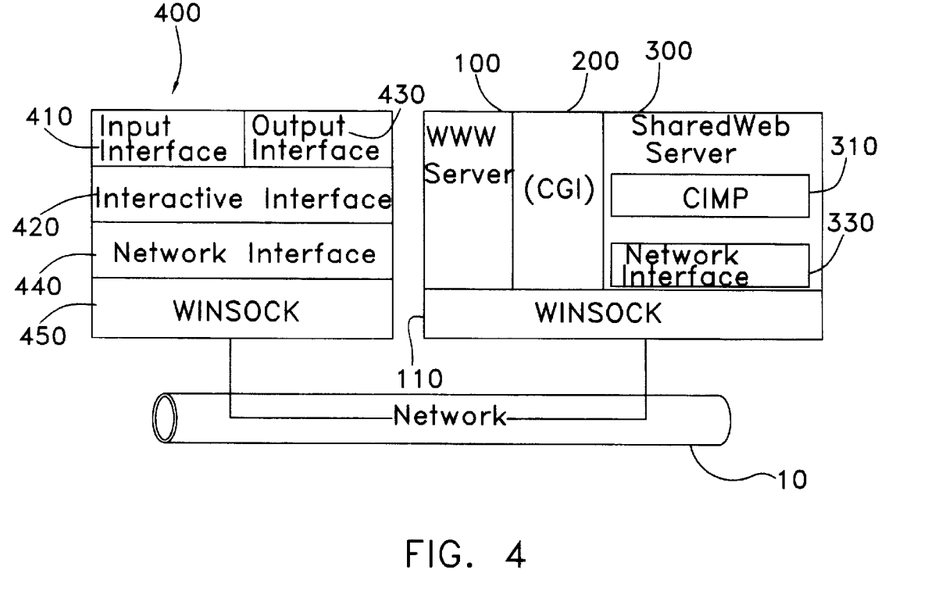
FIG. 4 is a schematic diagram showing detailed inside architecture of the SharedWeb system of FIG. 1.

As shown in FIG. 4, the WWW server 100, the CGI module 200, and the SharedWeb server 300 utilize a Winsock (Windows Sockets) module 110 for data communication via the network system 10 to each of the client sites 400 which is also installed with a Winsock module 450. The SharedWeb browser at each client site 400 further includes an input interface 410, an interactive interface 420, an output interface 430, and a network interface 440. On the server side, the SharedWeb server 300 is also provided with a network interface 330 which allows the SharedWeb server 300 to forward data directly to the network system 10.

Referring to FIGS. 5 through 9, the input interface 410 includes a file input box 411, a URL (Uniform Resource Locator) input module 412, a viewpoint control movement bar module 413, an avatar select module 414, a User Name input module 415, a chat input module 416, and an HTTP sending module 417. These modules are all well-known to WWW browser designers, so that detailed description thereof will not be given here in this specification.

The interactive interface 420 includes a filename identification module 421, a HTML parser 422, a VRML (Virtual Reality Modeling Language) parser 423, a scene manager 424, a registrant 425, a Dead Reckoning manager 426, an enable tricker 427, a User Name checker 428, and a listener 429. Except the Dead Reckoning manager 426, all the other modules are well-known to WWW browser designers, so that detailed description thereof will not be given here in this specification. The Dead Reckoning manager 426 is designed in accordance with the Dead Reckoning method utilized by the invention for minimizing the Object-State PDU rate at each client site.

The output interface 430 includes a homepage viewer 431, a 3D render engine 432, a User List window module 433, and a chat output window module 434. These modules are all well-known to WWW browser designers, so that detailed description thereof will not be given here in this specification.

The network interface 440 includes an HTTP module 441, a PDU sender 442, a PDU receiver 443, an HTML file download module 444, a 3D file download module 445, a PDU discharger 446, and a PDU packer 447. Except the PDU sender 442, the PDU receiver 443, the PDU discharger 446, and the PDU packer 447, all the other modules are well-known to WWW browser designers, so that detailed description thereof will not be given here in this specification. The PDU packer 447 packs information according to the modified PDU formats described earlier in this specification; the packed information is then sent by the PDU sender 442 to the network system 10 for transmission to its destination. When PDU information is sent from the network system 10, it is received by the PDU receiver 443 and then discharged by the PDU discharger 446.

On the server side, the CIMP module 310 includes a motion tracker 311, a registrar server 312, and an event control module 313. The motion tracker 311 is used to track the motion of the avatar of each of the users participating in the same 3D virtual-reality world provided by the WWW server 100. The tracked information includes the current position and orientation of the avatar, and is broadcast to all the other users participating in the same 3D virtual-reality world. The registrar server 312 is used to register client information about each user participating in the same 3D virtual-reality world. The event control module 313 is used to control the transfer of event data, such as IP addresses.

The network interface 330 includes a PDU sender 331, a PDU receiver 332, a PDU discharger 333, and a PDU packer 334. The PDU packer 334 packs information according to the modified PDU formats described earlier in this specification; the packed information is then sent by the PDU sender 331 to the network system 10 for transmission to its destination. When PDU information is sent from the network system 10, it is received by the PDU receiver 332 and then discharged by the PDU discharger 333.

Figure 5:
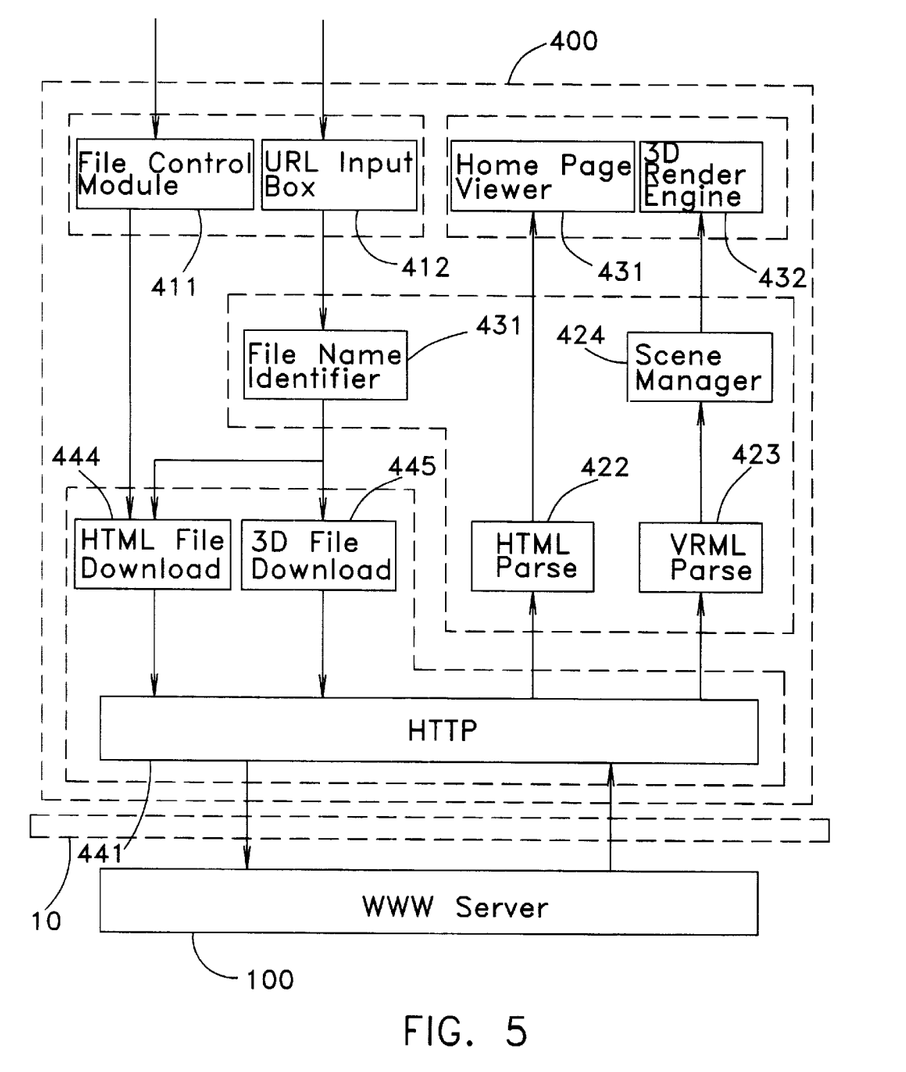
FIG. 5 is a schematic diagram showing the modules involved in an initialization procedure performed by the SharedWeb system of the invention.
Figure 6:
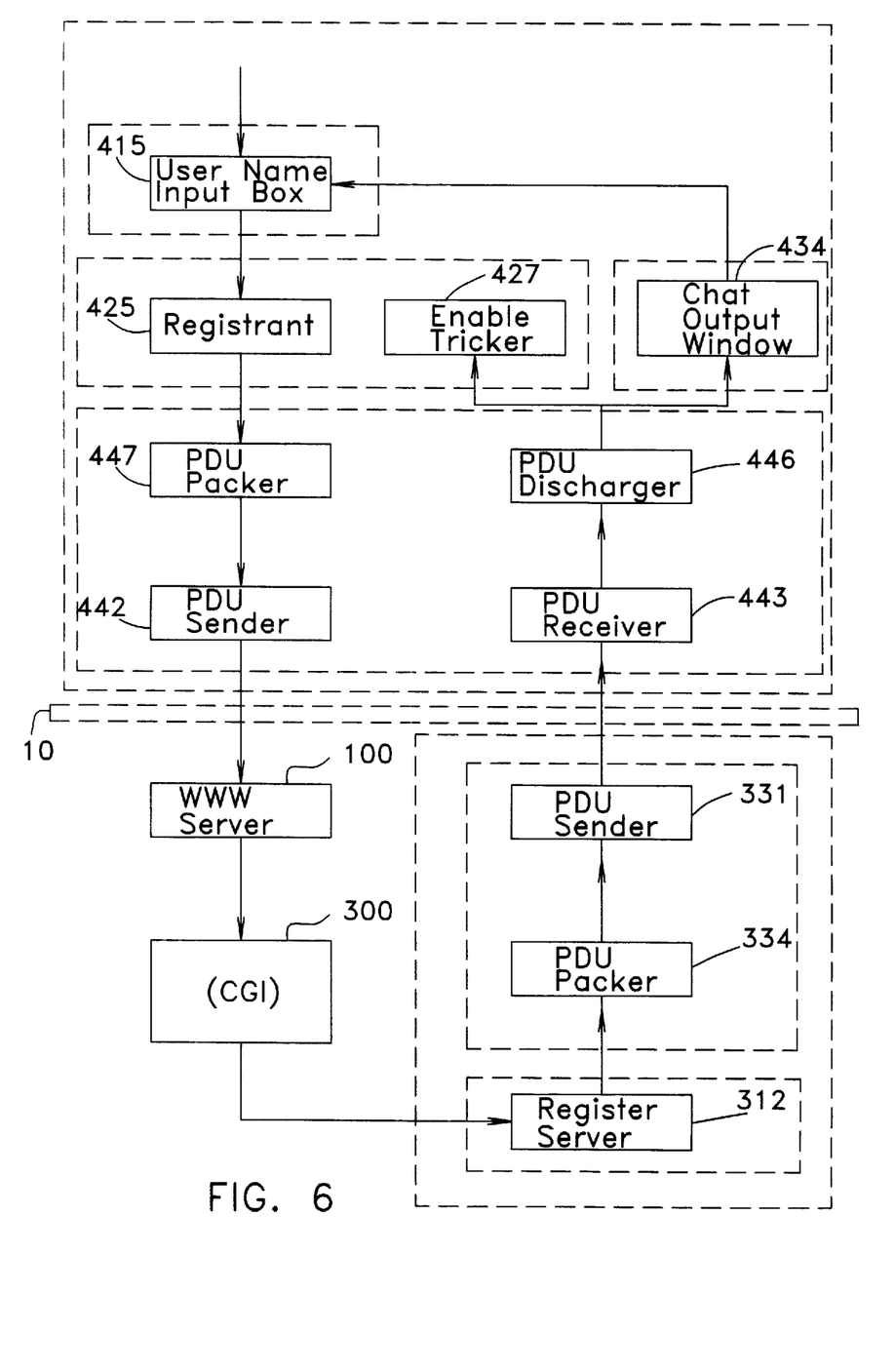
FIG. 6 is a schematic diagram showing the modules involved in a login procedure performed by the SharedWeb system of the invention.
Figure 7:
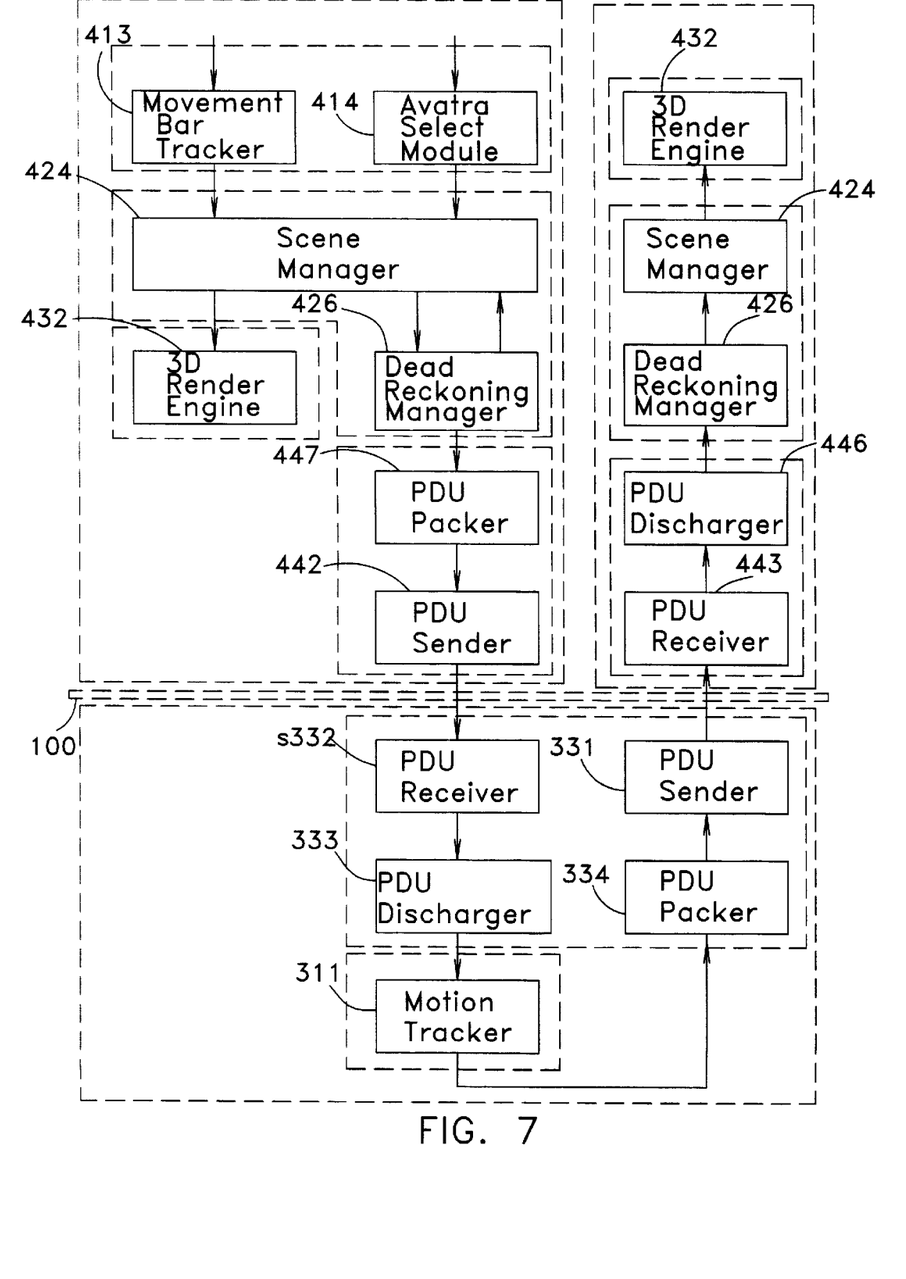
FIG. 7 is a schematic diagram showing the modules involved in a user-interactive procedure performed by the SharedWeb system of the invention.
Figure 8:
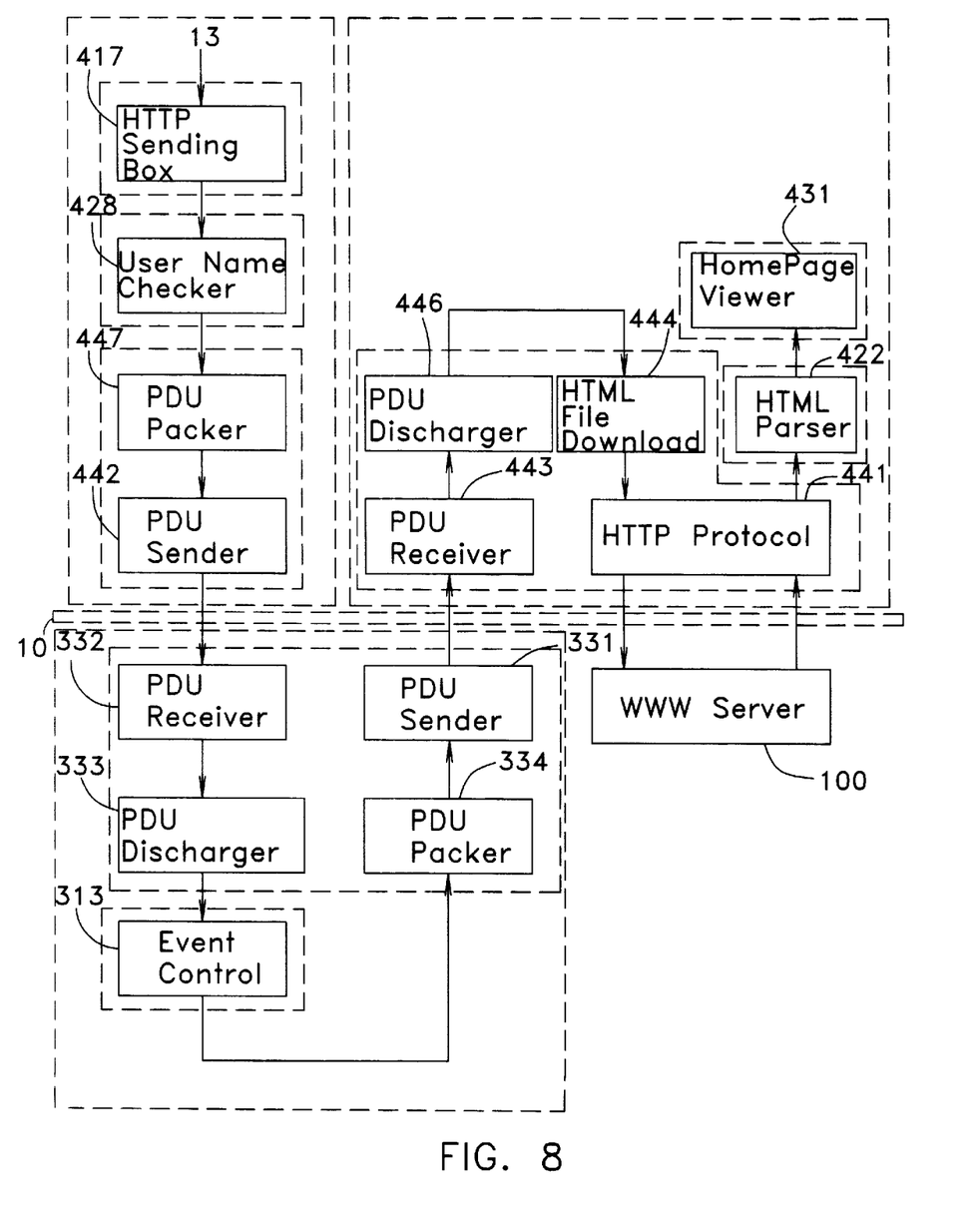
FIG. 8 is a schematic diagram showing the modules involved in a homepage-exchange procedure performed by the SharedWeb system of the invention.
Figure 9:
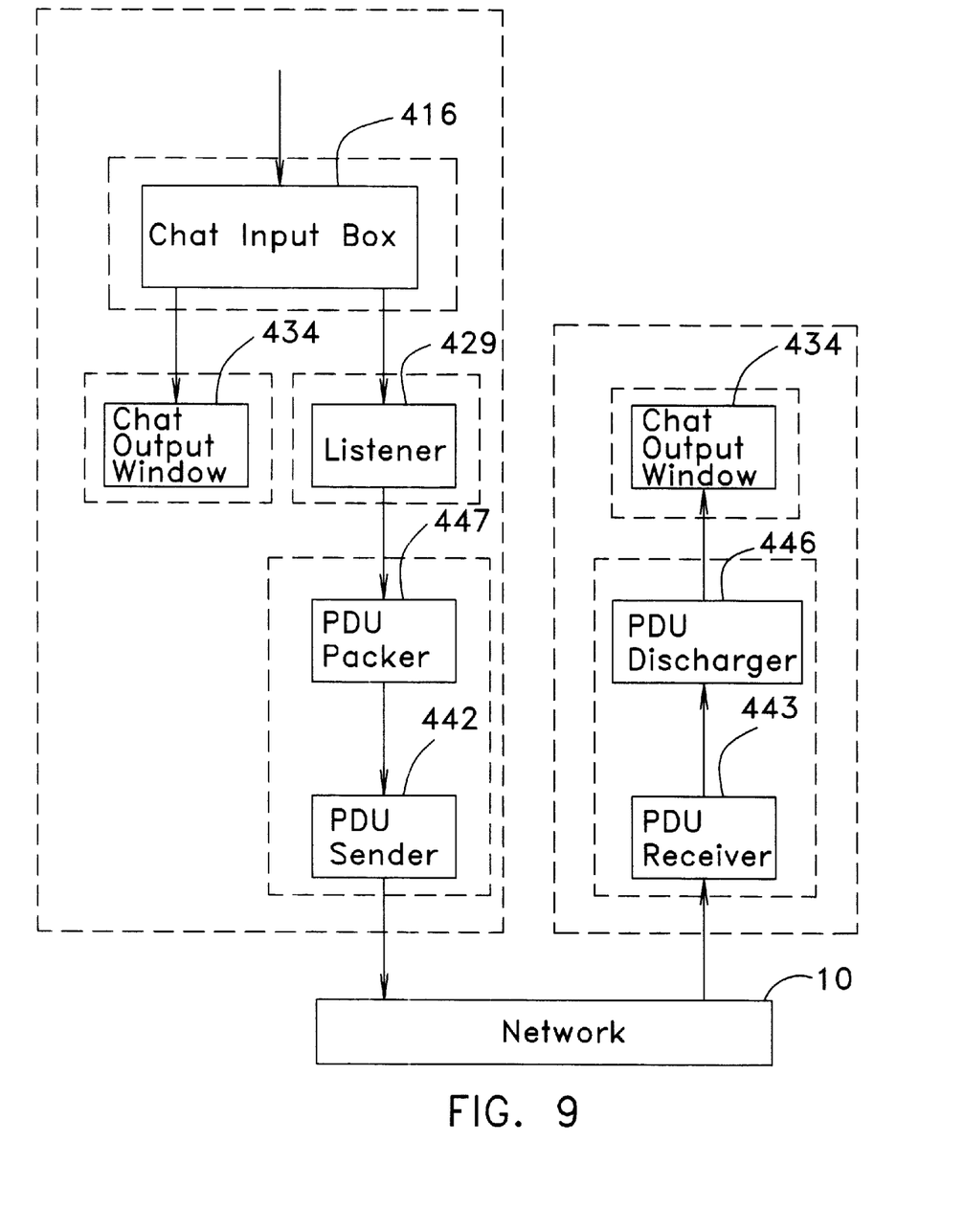
FIG. 9 is a schematic diagram showing the modules involved in a chat procedure performed by the SharedWeb system of the invention.

The use of the SharedWeb system includes an initialization procedure, a login procedure, a user-interactive procedure, a homepage-exchange procedure, and a chat procedure. FIG. 5 shows the modules that are involved in the initialization procedure; FIG. 6 shows the modules involved in the login procedure; FIG. 7 shows the modules involved in the user-interactive procedure; FIG. 8 shows the modules involved in the homepage- exchange procedure; and FIG. 9 shows the modules involved in the chat procedure.

Example of the Realization of the SharedWeb System

An example of the realization of the shared multiple-participant 3D virtual-reality environment (SharedWeb system) of the invention is the Tamkang University in Taiwan. In the 3D virtual-reality representation of the Tamkang University, a user (visitor) can enter the 3D virtual-reality campus (a first 3D virtual-reality world), then enter a building in the campus (a second 3D virtual-reality world), and then walk in any room in the building (a third 3D virtual-reality world). All visitors to the same place, for example a laboratory, can use the real-time interactive function provided by the invention to chat with each other. The SharedWeb system for the Tamkang University is located at:

dis.tku.edu.tw/SharedWeb/introduction.html

CONCLUSION

The invention provides a method and system for implementing real-time interactivity is provided across a shared multiple-participant 3D virtual-reality environment on the WWW. Through the use of the CIMP module, the SharedWeb system is capable of performing a client information recording function and a server-to-client call-back function that allow all the users participating in the same 3D virtual-reality world to interact with each other. Moreover, through the use of a Dead Reckoning method, Object-State PDUs can be transmitted in minimum amounts, thus increasing the degree of real-time interactivity among the users.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on a network system having a plurality of client sites and a WWW server providing a shared multiple-participant 3D virtual-reality environment, for the purpose of allowing the plurality of client sites to interact with each other in real time;

the method comprising the steps of:
  (1) providing a CIMP module with a client table for registering client information about each client site participating in the shared multiple-participant 3D virtual-reality environment;
  (2) linking the CIMP module via a CGI module to the WWW server;
  (3) at a newcomer's client site that just logs into the shared multiple-participant 3D virtual-reality environment, issuing a login request via the network system to the WWW server, causing the WWW server to download a virtual-reality scene file back to the newcomer's client site;
  (4) at the newcomer's client site, issuing an Initial PDU via the network system to the WWW server when the downloaded virtual-reality scene file is received;
  (5) at the WWW server, forwarding the received Initial PDU via the CGI module to the CIMP module;
  (6) at the CIMP module, upon receiving the Initial PDU, performing the steps of:
    (6-1) issuing an Acknowledge PDU with a uniquely-assigned User ID via the network system back to the newcomer's client site;
    (6-2) forwarding the received Initial PDU together with the newcomer's User ID to every other client site that is previously registered in the client table indicative of current participation in the shared multiple-participant 3D virtual-reality environment;
  (7) at any client site, if a change in avatar state occurs, issuing a corresponding Object-State PDU indicative of the change in avatar state to the CIMP module; and (8) at the CIMP module, broadcasting the received Object-State PDU to every other client site currently participating in the shared multiple-participant 3D virtual-reality environment, if any.

2. The method of claim 1, wherein in the step (7), each Object-State PDU is generated in response to such a positional change in avatar state that the positional change causes the difference between the actual avatar position after the positional change and the predicted avatar position by a Dead Reckoning method exceeds a predetermined threshold.

3. The method of claim 2, wherein the predetermined threshold is three times the width of the avatar.

4. The method of claim 1, wherein the Initial PDU format, the Acknowledge PDU format, and the Object-State PDU format each include a PDU Header field for containing a PDU header for PDU identification, which includes:
   a PDU Type field for indicating the type of the associated PDU;
   a Time Stamp field for indicating the time when the associated PDU is issued;
   a Scene Name field for indicating the filename of the downloaded virtual-reality scene file; and
   a Scene ID field for indicating a uniquely identification name assigned to the 3D virtual-reality world represented by the downloaded virtual-reality scene file.

5. The method of claim 4, wherein the Initial PDU fonnat further includes:
   a User Information field for containing user information about the identity of the user participating in the virtual-reality world; and
   an LTP-UID field for containing three pieces of information respectively indicative of user's login name, time stamp, and listening port at the client site.

6. The method of claim 5, wherein the User Information field in the Initial PDU format includes:
   a User ID field for containing a unique user identification number assigned by the virtual-reality environment when the user successfully logs in;
   an IP Address field for containing the IP address of the associated client site; and
   an Avatar Type field for containing user's selected avatar type in the virtual-reality environment.

7. The method of claim 4, wherein the Acknowledge PDU format further includes:
   a User Information field for containing user information about the identity of the user participating in the virtual-reality world; and
   an LTP-UID field for containing three pieces of information respectively indicative of user's login name, time stamp, and listening port at the client site.

8. The method of claim 7, wherein the User Information field in the Acknowledge PDU format includes:
   a User ID field for containing a unique user identification number assigned by the virtual-reality environment when the user successfully logs in;
   an IP Address field for containing the IP address of the associated client site; and
   an Avatar Type field for containing user's selected avatar type in the virtual-reality environment.

9. The method of claim 4, wherein the Object-State PDU format further includes:
   a Location field for storing the current location of the avatar of the associated client site;
   a Linear Velocity field for storing the linearly velocity of the movement of the avatar of the associated client site;
   a Orientation field for storing the current orientation of the avatar of the associated client site; and
   a DR Parameter field for indicating a user-specified Dead Reckoning algorithm.

10. The method of claim 1, wherein the CIMP module utilizes Unreliable Datagram Protocol for data transfer of each Acknowledge PDU and Object-State PDU to each client site participating in the shared multiple-participant 3D virtual-reality environment.

11. A shared multiple-participant 3D virtual-reality system for use on a network system connecting to a plurality of client sites, capable of allowing real-time interactivity across the client sites participating therein;
   the shared multiple-participant 3D virtual-reality system comprising:
      (a) a WWW server for serving up a plurality of virtual-reality scene files, each representing a 3D virtual-reality world;
      (b) a browser program running at each of the participating client sites;
      (c) a CGI module connected to the WWW server; and
      (d) a CIMP module having a client table, the CIMP module being coupled to the CGI module so that PDU information received by the WWW server can be forwarded from the WWW server to the CIMP module and being used for managing client information about every client site currently participating in the virtual-reality world, if any;
   wherein
      at a newcomer's client site that just logs into the shared multiple-participant 3D virtual-reality environment, the browser program at the newcomer's client site issues a login request via the network system to the WWW server, causing the WWW server to download a virtual-reality scene file back to the newcomer's client site;
      in response, the browser program at the newcomer's client site issues an Initial PDU via the network system to the WWW server when the downloaded virtual-reality scene file is received;
      in response, the WWW server forwards the received Initial PDU via the CGI module to the CIMP module;
      at the CIMP module, upon receiving the Initial PDU, the CIMP module performs the steps of:
         issuing an Acknowledge PDU with a uniquely-assigned User ID via the network system back to the newcomer's client site;
         forwarding the received Initial PDU together with the newcomer's User ID to every other client site that is previously registered in the client table indicative of current participation in the shared multiple-participant 3D virtual-reality environment; and
      at any client site, if a change in avatar state occurs, issuing a corresponding Object-State PDU indicative of the change in avatar state to the CIMP module which then broadcasts the received Object-State PDU to every other client site currently participating in the shared multiple-participant 3D virtual-reality environment, if any.

12. The shared multiple-participant 3D virtual-reality system of claim 11, wherein each Object-State PDU is generated in response to such a positional change in avatar state that the positional change causes the difference between the actual avatar position after the positional change and the predicted avatar position by a Dead Reckoning method exceeds a predetermined threshold.

13. The shared multiple-participant 3D virtual-reality system of claim 12, wherein the predetermined threshold is three times the width of the avatar.

14. The shared multiple-participant 3D virtual-reality system of claim 11, wherein the Initial PDU format, the Acknowledge PDU format, and the Object-State PDU format each include a PDU Header field for containing a PDU header for PDU identification, which includes:
- a PDU Type field for indicating the type of the associated PDU;
- a Time Stamp field for indicating the time when the associated PDU is issued;
- a Scene Name field for indicating the filename of the downloaded virtual-reality scene file; and
- a Scene ID field for indicating a uniquely identification name assigned to the 3D virtual-reality world represented by the downloaded virtual-reality scene file.

15. The shared multiple-participant 3D virtual-reality system of claim 14, wherein the Initial PDU format further includes:
- a User Information field for containing user information about the identity of the user participating in the virtual-reality world; and
- an LTP-UID field for containing three pieces of information respectively indicative of user's login name, time stamp, and listening port at the client site.

16. The shared multiple-participant 3D virtual-reality system of claim 15, wherein the User Information field in the Initial PDU format includes:
- a User ID field for containing a unique user identification number assigned by the virtual-reality environment when the user successfully logs in;
- an IP Address field for containing the IP address of the associated client site; and
- an Avatar Type field for containing user's selected avatar type in the virtual-reality environment.

17. The shared multiple-participant 3D virtual-reality system of claim 14, wherein the Acknowledge PDU format further includes:
- a User Information field for containing user information about the identity of the user participating in the virtual-reality world; and
- an LTP-UID field for containing three pieces of information respectively indicative of user's login name, time stamp, and listening port at the client site.

18. The shared multiple-participant 3D virtual-reality system of claim 17, wherein the User Information field in the Acknowledge PDU format includes:
- a User ID field for containing a unique user identification number assigned by the virtual-reality environment when the user successfully logs in;
- an IP Address field for containing the IP address of the associated client site; and
- an Avatar Type field for containing user's selected avatar type in the virtual-reality environment.

19. The shared multiple-participant 3D virtual-reality system of claim 14, wherein the Object-State PDU format further includes:
- a Location field for storing the current location of the avatar of the associated client site;
- a Linear Velocity field for storing the linearly velocity of the movement of the avatar of the associated client site;
- a Orientation field for storing the current orientation of the avatar of the associated client site; and
- a DR Parameter field for indicating a user-specified Dead Reckoning algorithm.

20. The shared multiple-participant 3D virtual-reality system of claim 11, wherein the CIMP module utilizes Unreliable Datagram Protocol for data transfer of each Acknowledge PDU and Object-State PDU to each client site participating in the shared multiple- participant 3D virtual-reality environment.

* * * * *